Patented Jan. 26, 1954

2,667,481

UNITED STATES PATENT OFFICE 2,667,481

PROCESS FOR MAKING WATER-SOLUBLE HYDROXYALKYL CELLULOSE ETHERS

Clinton W. Tasker, Upland, Pa., assignor to American Viscose Corporation, Wilmington, Del., a corporation of Delaware No Drawing. Application July 28, 1949, Serial No. 107,372

9 Claims. (Cl. 260—232)

This invention relates to improvements in the manufacture of derivatives of cellulose and more particularly to improved methods of manufacturing water-soluble hydroxyalkyl derivatives of cellulose.

It is an object of this invention to produce hydroxyalkyl derivatives of cellulose soluble in both hot and cold water as well as in aqueous alkali and acids in crumb or filament form.

Another object is to produce a water-soluble hydroxyalkyl cellulose whereby the compound is obtained directly in a pure form so that further purification or precipitation steps are eliminated.

Another object is to provide a method whereby alkali-soluble, water-insoluble hydroxyalkyl cellulose, ethers, or activated cellulose, or admixtures of the two, as well as filaments, yarns, and films made from the same, may be rendered water-soluble.

Another and final object of the present invention is to produce water-soluble hydroxyalkyl cellulose derivatives whereby said derivatives are obtained directly in a pure form without the aid of a catalyst.

It is well known in the art to produce water-soluble cellulose ethers by first treating cellulose, such as cotton linters, wood pulp, regenerated cellulose, and the like, with alkali, according to well known standard procedures, to form alkali or soda cellulose, and then etherifying the same, either with or without the further addition of NaOH. This etherification is continued until sufficient substitution has taken place in the cellulose molecule to produce a water-soluble cellulose ether. The isolation and purification of the resultant water-soluble cellulose ether has presented considerable difficulty, however, due to its solubility in water which requires the use of comparatively expensive organic solvents, such as ethyl alcohol of at least 80% concentration, for the removal of deleterious inorganic salts, dialysis or other special treatment. In the case of organic solvents, repeated washings are necessary and the installation of a solvent recovery system is essential for economic operation.

It is also well known in the prior art to produce water-soluble ethers by dissolving or dispersing a water-insoluble, alkali-soluble cellulose ether in a caustic soda solution and adding thereto sufficient alkylating agent, for example diethyl sulfate, to produce a water-soluble cellulose ether. However, here again the same difficulties outlined above are encountered due to the water solubility of the final product.

The problems and difficulties apparent in the prior art are overcome by the practice of the present invention and the objects of the invention are accomplished by the etherification, under suitable conditions hereinafter to be described, of a water-insoluble, alkali-soluble cellulose ether in a pure, anhydrous form or a suitably activated cellulose, to such an extent as to produce a water-soluble cellulose ether obtained directly in substantially pure condition and without the aid of a catalyst.

By activated cellulose as used herein is meant cellulose which has been treated or swollen with an alkaline solution, such as sodium hydroxide, washed free of alkali and then dried in such a manner as to obtain a fluffy product free of hard pellets. Drying may be accomplished in any convenient manner, for example by the use of organic solvents.

Heretofore in manufacturing cellulose ethers, both alkali-soluble and water-soluble, it has been the practice to start with alkali cellulose of various compositions and add sufficient liquid or gaseous etherifying agent until the desired average degree of substitution in the cellulose molecule is reached or until the desired solubility characteristics of the final product have been attained. The sodium hydroxide present in the starting material has a catalytic effect on the reaction. Other catalysts have also been used as alkylamines or alkylated aromatic amines, or hydroaromatic amines.

In the present invention, the use of a catalyst of any description is eliminated. As a starting material, there is employed a pure dry alkali-soluble, water-insoluble ethylene oxide ether of cellulose or a cellulose which has been suitably activated, as defined above, or filaments and yarns made from the same or from admixtures of the two. As an example of regenerated cellulose filament or yarn made from activated cellulose may be mentioned those made from viscose.

The alkali-soluble cellulose ether is reacted with liquid ethylene oxide or other suitable etherifying agent, under pressure and heated until a water-soluble cellulose ether is produced. The product is dried by mere evaporation of the excess ethylene oxide and a substantially pure product is obtained requiring no further purification. While it is preferred to employ ethylene oxide as an etherifying agent, any one of the following may be used: other alkylene oxides, e. g., propylene oxide, glycides and the like.

By way of illustrating but in no way limiting the invention, the following specific example is given:

Example

A suitable charge of an alkali-soluble, water-insoluble ethylene oxide ether of cellulose in a fluffy, substantially anhydrous form, having an average degree of substitution of from 0.1 to 0.5 ethylene oxide groups per glucose ($C_6H_{10}O_5$) unit, an ash content of less than 0.5% and previously dried to a moisture content substantially less than 1% and usually less than 0.5%, is placed in a reaction vessel which is capable of withstanding pressure up to 400 lbs. per square inch gauge pressure or 27.2 atmospheres. A large excess of ethylene oxide is added, 35 mols of oxide per mol of cellulose or cellulose ether being satisfactory. The vessel is sealed, heated and the contents agitated by some suitable means. The temperature is raisd until a maximum of 100° C. is reached. The pressure developed at this temperature will be in the neighborhood of 200 lbs. per square inch gauge pressure or 13.6 atmospheres. After a reaction period of from 12-24 hours, the vessel is allowed to cool, the gas pressure is relieved, and the product removed. The excess ethylene oxide may be recovered in a suitable condenser system and the product rapidly becomes air-dry by evaporation of the excess ethylene oxide contained therein. The product may have an average degree of substitution of from 2-5 ethylene oxide groups per glucose ($C_6H_{10}O_5$) unit. The product is soluble in both hot and cold water and further soluble in aqueous alkali and acids. It has an ash content of less than 0.25% and no purification of the same is required.

The starting material of the above example, that is the alkali-soluble, water-insoluble hydroxyalkyl cellulose ether, may be prepared as follows: cellulose, in the form of pulp, cotton linters, and the like, is converted into alkali or soda cellulose in the conventional manner, such as steeping the cellulose in NaOH, pressing, shredding and aging. The aged alkali cellulose is then placed in a suitable mixer, for example a Werner-Pfleiderer mixer, and sufficient ethylene oxide, or other etherifying agent such as enumerated above, is added either in gaseous or liquid form while mixing. The temperature is regulated by means of a cooling jacket around the mixer. The reaction is continued until there is an average degree of substitution of ethylene oxide groups per glucose ($C_6H_{10}O_5$) unit of from 0.1 to 0.5 and preferably closely approximating 0.5 in order to cut down on reaction time in the second state, i. e. conversion to the water-soluble hydroxyalkyl cellulose ether.

It should be noted that in this preliminary stage of forming the alkali-soluble, water-insoluble hydroxyalkyl cellulose ether the presence of a catalyst is not undesirable since the salts formed may easily be removed by washing thoroughly with water since the product is water-insoluble. This is impossible in the final stage since the hydroxyalkyl cellulose ether is water-soluble. Therefore the presence of NaOH, which is normally present in alkali cellulose and which acts as a catalyst, is not undesirable and in fact is desirable since the reaction time is lessened and the temperature required to effect the desired substitution is lowered.

The alkali-soluble, water-insoluble hydroxyalkyl cellulose ether may then be dissolved in an alkaline solution such as NaOH and spun into filaments through a conventional spinneret into a coagulating bath composed of an inorganic salt such as sodium sulfate, ammonium sulfate or admixtures of the two, or into an acid bath such as sulfuric or acetic. The filaments are then thoroughly washed with water and dried until all possible removable moisture has been eliminated therefrom. The substantially anhydrous filaments of alkali-soluble, water-insouble hydroxyalkyl cellulose ether are then placed in the reaction vessel, described in the above example, in the form of skeins, hanks, or in loose form on a tray for example, and the same procedure followed as described in the above example.

It is to be noted that alkali-soluble, water-insolukle hydroxyalkyl cellulose ethers in the form of films or sheets instead of filaments or yarns may similarly be converted to a water-soluble form according to the method outlined herein and they fall easily within the scope of the present invention.

In the case of regenerated cellulose filaments and films, the time of reaction is considerably less and the temperature necessary to effect complete reaction is also less. This is due to the fact that regenerated cellulose is more reactive and being in filament form a larger surface area is exposed.

It is very important to keep the moisture content of the starting cellulose or cellulose ether as low as possible in order to prevent polyethylene glycols from being formed by side reactions. Further, as the present invention contemplates, the use of no catalyst effects a considerable saving in ethylene oxide in that the polyglycol side reactions will be at a minimum.

In the present invention 20-50 mols of ethylene oxide or etherifying agent may be employed. Temperature ranging from 80-110° C. may be used. It is to be noted that below 80° C. the reaction becomes very slow and above 110° C. the reaction becomes too fast to suitably control the uniformity of the resultant product. The time of reaction may be varied from 8 to 48 hours depending on other reaction conditions and the reactivity of the cellulose or alkali-soluble cellulose ether employed as a starting material.

In addition to advantages already pointed out in the above description, the product may be air-dried which replaces heat or vacuum drying at a considerable saving in expenses of operation. The invention is advantageous in that it presents an efficient and speedy method of producing water-soluble filaments and yarns extremely useful in the preparation of fabrics where it is later desired to remove certain of the yarns to produce novel effects and the water-soluble yarns also being useful in weaving fabrics as a means of support for other more fragile yarns, then later dissolving out the water-soluble yarns. In this connection, the product of the present invention is also useful in the manufacture of microporous sheet materials such as filters, hospital sheeting, surgical bandages and the like. This is accomplished by forming a carded mat or felt, of desired thickness, of the water-soluble hydroxyalkyl cellulose ether fibers and impregnating the same, so as to fill the spaces between the fibers and form an integral solid body, with a suitable impregnant, such as a resin in liquid form, rubber, etc. The water-soluble hydroxyalkyl cellulose ether fibers are then dissolved out with water leaving a microporous sheet.

As has been previously stated, the process has the advantage of being capable of being carried out without the aid of a catalyst and thus eliminating the tedious and costly purification procedure of the final product which is necessary when known procedures are followed.

I claim:

1. A process for producing a water-soluble hydroxyalkyl cellulose comprising reacting a mass consisting of a substantially anhydrous alkali-soluble, water-insoluble hydroxyalkyl cellulose having between 0.1 and 0.5 alkylene oxide groups per glucose unit and an alkylene oxide etherifying agent at 80–110° C. under pressure until a substitution of 2 to 5 alkylene oxide groups per glucose unit is attained, said water-insoluble cellulose ether being selected from the group consisting of those derived from the reaction of cellulose with a compound selected from the group consisting of ethylene oxide, propylene oxide, and glycide, and the etherifying agent being selected from the group consisting of ethylene oxide, propylene oxide, and glycide.

2. A process for producing a water-soluble hydroxyethyl cellulose comprising reacting a mass consisting of a substantially anhydrous alkali-soluble, water-insoluble hydroxyethyl cellulose having between 0.1 and 0.5 ethylene oxide groups per glucose unit and ethylene oxide at 80–110° C. under pressure until a substitution of 2 to 5 ethylene oxide groups per glucose unit is attained.

3. A process for producing a water-soluble hydroxyethyl cellulose comprising reacting a mass consisting of a substantially anhydrous alkali-soluble, water-insoluble hydroxyethyl cellulose having approximately 0.5 ethylene oxide groups per glucose unit and ethylene oxide at 80 to 110° C. under 13.6 atmospheres pressure for 8 to 24 hours to produce a cellulose ether having 2 to 5 ethylene oxide groups per $C_6H_{10}O_5$ unit.

4. A process for producing a water-soluble hydroxyalkyl cellulose comprising reacting a mass consisting of a substantially anhydrous alkali-soluble, water-insoluble hydroxyalkyl cellulose having between 0.1 and 0.5 alkylene oxide groups per glucose unit and an alkylene oxide etherifying agent at 80 to 110° C. under pressure ranging up to 27.2 atmospheres, said water-insoluble cellulose ether being selected from the group consisting of those derived from the reaction of cellulose with a compound selected from the group consisting of ethylene oxide, propylene oxide, and glycide, and the etherifying agent being selected from the group consisting of ethylene oxide, propylene oxide, and glycide.

5. A process for producing a water-soluble hydroxyalkyl cellulose comprising reacting a mass consisting of a substantially anhydrous alkali-soluble, water-insoluble hydroxyalkyl cellulose having between 0.1 and 0.5 alkylene oxide groups per glucose unit and an alkylene oxide etherifying agent at 80 to 110° C. under pressure ranging up to 27.2 atmospheres for 12 to 24 hours to produce a cellulose ether having 2 to 5 alkylene oxide groups per $C_6H_{10}O_5$ unit, said water-insoluble cellulose ether being selected from the group consisting of those derived from the reaction of cellulose with a compound selected from the group consisting of ethylene oxide, propylene oxide, and glycide, and the etherifying agent being selected from the group consisting of ethylene oxide, propylene oxide, and glycide.

6. A process for producing a water-soluble hydroxyalkyl cellulose comprising reacting an alkali cellulose with an alkylene oxide selected from the group consisting of ethylene oxide, propylene oxide, and glycide until an alkali-soluble, water-insoluble hydroxyalkyl cellulose having an average degree of substitution of 0.1 to 0.5 alkylene oxide group per $C_6H_{10}O_5$ unit is attained, washing out with water the salt contained in the water-insoluble ether, drying the washed ether, mixing the substantially anhydrous ether solely with an alkylene oxide selected from the group consisting of ethylene oxide, propylene oxide, and glycide, and reacting said mixture under heat and pressure until a water-soluble cellulose ether having 2 to 5 alkylene oxide groups per $C_6H_{10}O_5$ unit is obtained.

7. A process as defined in claim 6 in which the alkylene oxide is ethylene oxide.

8. A process for producing a water-soluble hydroxyalkyl cellulose comprising reacting an alkali cellulose with an alkylene oxide selected from the group consisting of ethylene oxide, propylene oxide, and glycide until an alkali-soluble, water-insoluble hydroxyalkyl cellulose having an average degree of substitution of 0.1 to 0.5 alkylene oxide group per $C_6H_{10}O_5$ unit is attained, washing out with water the salt contained in the water-insoluble ether, drying the washed ether, mixing the substantially anhydrous ether solely with an alkylene oxide selected from the group consisting of ethylene oxide, propylene oxide, and glycide, and reacting said mixture at 80 to 110° C. under a pressure above atmospheric until a water-soluble cellulose ether having 2 to 5 alkylene oxide groups per $C_6H_{10}O_5$ unit is obtained.

9. A process as defined in claim 8 in which the alkylene oxide is ethylene oxide, the pressure is from 13.6 to 27.2 atmospheres, and the second reaction is carried on for a period of 12 to 24 hours.

CLINTON W. TASKER.

References Cited in the file of this patent

UNITED STATES PATENTS

| Number | Name | Date |
|---|---|---|
| 1,877,856 | Hagedorn | Sept. 20, 1932 |
| 2,033,820 | Dreyfus | Mar. 10, 1936 |
| 2,047,189 | Berger et al. | July 14, 1936 |
| 2,055,892 | Dreyfus | Sept. 29, 1936 |
| 2,055,893 | Dreyfus | Sept. 29, 1936 |
| 2,160,782 | Maasberg | May 30, 1939 |
| 2,163,723 | Whitehead | June 27, 1939 |
| 2,236,544 | Maxwell | Apr. 1, 1941 |
| 2,288,200 | Meyer | June 30, 1942 |
| 2,488,631 | Kunz | Nov. 22, 1949 |